May 3, 1938.   K. SCHWARZ   2,116,217
VISUAL INDICATOR FOR TUNING MEANS
Filed Sept. 19, 1935   3 Sheets-Sheet 1
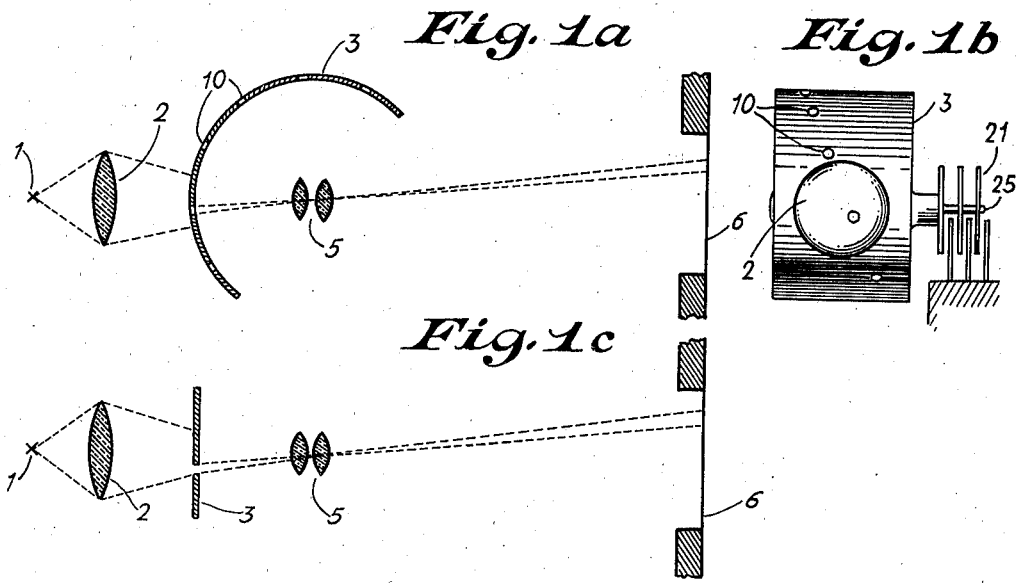
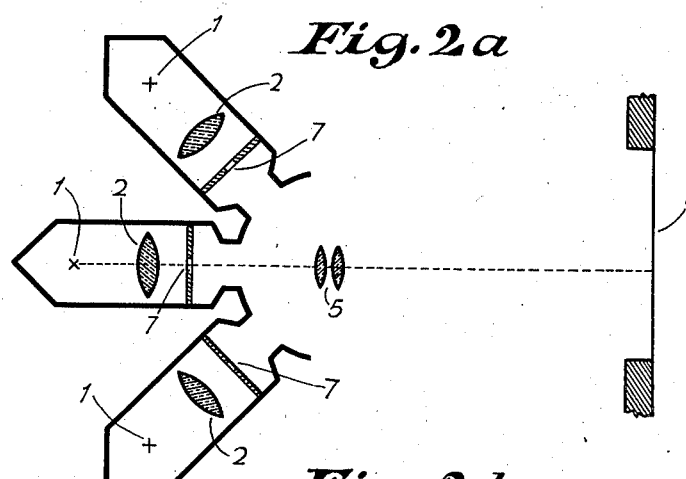
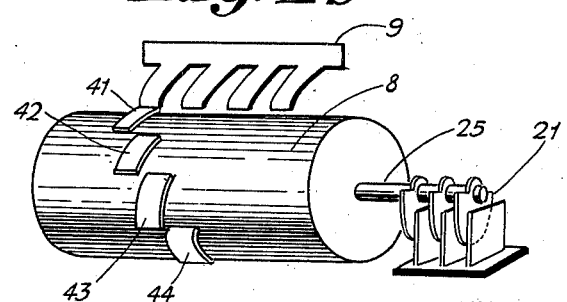
INVENTOR
KARL SCHWARZ
BY
ATTORNEY May 3, 1938.　　　　　K. SCHWARZ　　　　　2,116,217
VISUAL INDICATOR FOR TUNING MEANS
Filed Sept. 19, 1935　　　3 Sheets-Sheet 3
*Fig. 6*
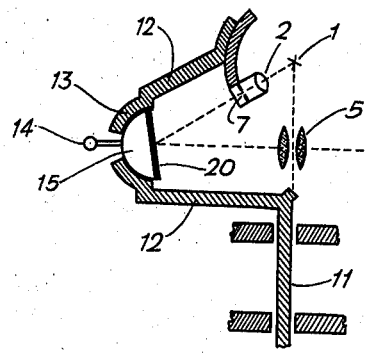
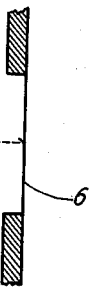
*Fig. 7*　　　　　　　　*Fig. 9*
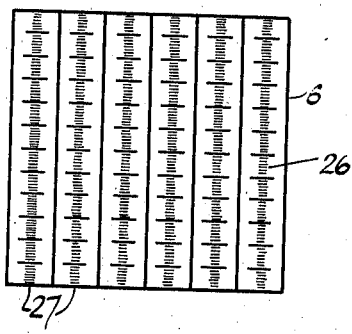
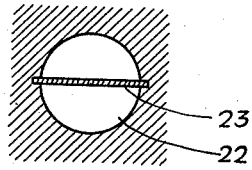
*Fig. 8a*　　　　　　　*Fig. 8b*
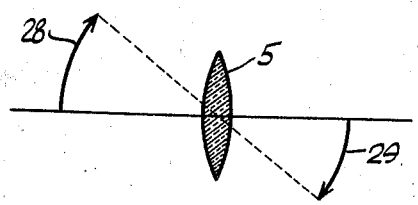
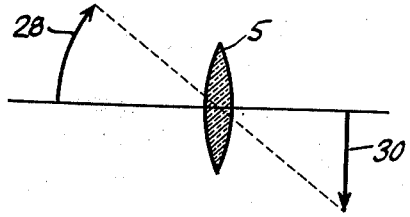
INVENTOR
KARL SCHWARZ
BY　*H. S. Grover*
ATTORNEY Patented May 3, 1938

2,116,217

UNITED STATES PATENT OFFICE 2,116,217

VISUAL INDICATOR FOR TUNING MEANS

Karl Schwarz, Berlin, Germany, assignor, by mesne assignments, to Telefunken Gesellschaft für Drahtlose Telegraphie m. b. H., Berlin, Germany, a corporation of Germany Application September 19, 1935, Serial No. 41,203
In Germany July 25, 1934

3 Claims. (Cl. 88—24)

The present invention relates to an optical device which conjointly with a long scale suitably arranged upon a reduced area, allows of accurate reading of the position or setting of a rotary tuning condenser.

One advantage of this arrangement resides in the fact that in spite of the reduced scale or dial area, accurate and easy reading of the condenser adjustment is made feasible.

The present invention is predicated upon the idea that a long scale may be accommodated upon a relatively reduced area or surface if the dial or scale is divided into a number of portions or sections, and if the latter are placed contiguous to one another. A scale as described necessitates an arrangement so that the light spot serving for reading, after having covered or passed over one of the dial sections, is caused to pass onto the next portion or section which continues the dial in the proper manner. Arrangements are preferably so made that a slit or a "mark" by means of a condensing lens is illuminated from a source of light. An image of the said slit is projected by one or more objective lenses upon the dial. This offers an advantage on the ground that any replacement of the lamp makes re-adjustment unnecessary. Owing to the effect of the interposed condensing lens, such a system offers the further merit that the luminous intensity of the image of the mark on the dial is increased, a feature that is particularly valuable when taking readings by daylight.

Figure 3:
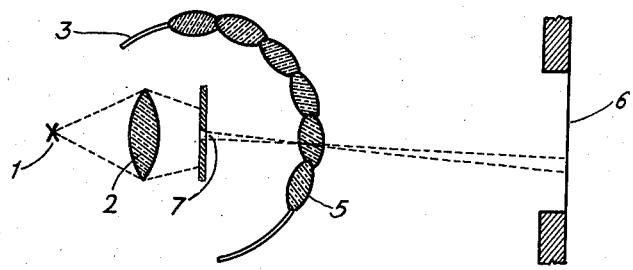
Figure 4A:
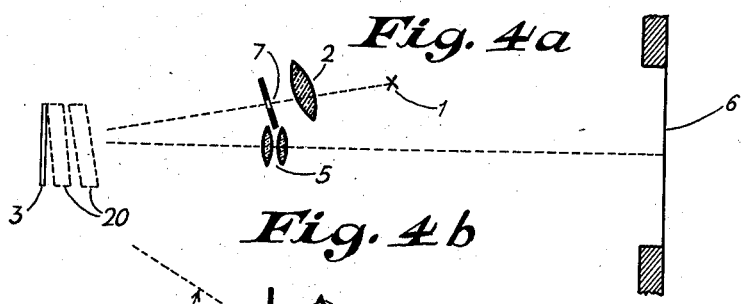
Figure 4B:
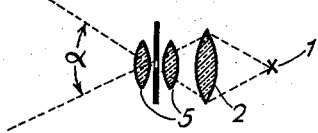
Figure 5A:
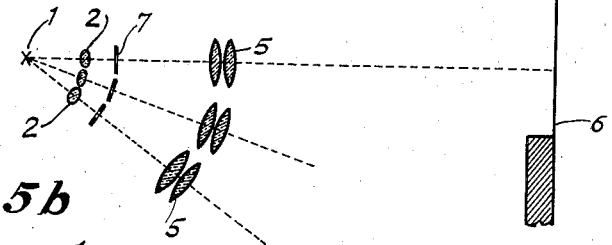

For a more detailed description of the invention reference is made to the accompanying drawings in which:

Figs. 1a, 1b and 1c show a form of the invention in which a plurality of movable slits are used with a single light source and scale, Figs. 2a and 2b show a modification in which a plurality of stationary slits and light sources are used in connection with a single scale, Figs. 3 and 5a show modifications in which a plurality of movable lenses are used with a single light source, Figs. 4a, 4b, 5b and 6 show modifications in which a plurality of mirrors is used with a single light source, Fig. 7 shows the subdivided scale, and Figs. 8a and 8b show the action of the objective lens.

Fig. 9 shows one form of slit for use with the scale of Fig. 7.

Referring to the drawings,

Fig. 1a shows a source of light 1, a condensing lens 2, and an objective lens 5. Upon a drum 3 are disposed as many slits or diaphragms 10 suitably staggered in reference to one another as there are subdivisions in the dial. Turning the diaphragm drum 3, which is fixedly connected with the condenser spindle 25, through a space illuminated from the condensing lens 2, then the image of the slit produced by the objective 5 travels over the scale 26 which is arranged upon the surface 6 in a number of vertical columns 27 as shown in Fig. 7. As the drum 3 with the condenser rotor 21 is moved, a position will be reached in which the image of the mark under view reaches the end of the co-ordinated section of the dial. Then the pencil of light will strike the scale surface which has been provided for the adjoining scale division or section. The light which passes through the second diaphragm 10 will then strike the adjacent scale section 27 because the diaphragm is suitably shifted along the drum axis of diaphragm drum 3.

Fig. 1b shows a view of the diaphragm drum 3 which is rigidly connected with the rotary condenser 21 and the openings 10 arranged in different planes.

Fig. 1c is a plan view of the described arrangement, the drum being shown only in section. Because of the disposition as above described, not more than one diaphragm may be shown in this section.

Fig. 2a illustrates an embodiment in which only the objective 5 is common to the spot reading means. By means of the condensing lenses 2, slits 7 are illuminated from the lamps 1, and images of the said slits are thrown upon the scale 6 through the said objective 5. The geometric arrangement of the optical systems is again so chosen that the spots are changed on the dial in the proper way. By means of a switch drum 8 which is connected with the condenser rotor 21, arrangements can be so made that only the particular lamp will burn whose light strikes the dial 6 in the corresponding position.

Fig. 2b illustrates an embodiment of the switch drum 8. The same carries raised portions 41, 42, 43, 44 the number of which equals the number of the lamps. Arranged for frictional contact with these surfaces is a contact brush 9 which in each position of the switch drum establishes connection with one lamp and one lamp only.

Fig. 3 shows another light spot device. In this embodiment, the light-source 1, condensing lens 2 and slit 7 are common to all of the indicator means and are stationary, while a rim of objectives 5 seated upon a drum 3 partakes of the movement of the rotary condenser. The objectives 5 are disposed in a similar manner as the diaphragms or slits 10 in Fig. 1b.

Fig. 4a shows an especially simple form of construction in which the light-source, condensing lens, slit, and objective are common to all of the dial sections. By means of a number of mirrors 20 suitably disposed upon a drum 3, movement of the spot is insured over the whole scale 6.

Fig. 4b shows a view of this arrangement in a direction at right angles to Fig. 4a. The mirror 20 travels through an illuminated (solid) angle which is of such a size that a scale section can be illuminated by the mirror regardless of its position. This makes it necessary that the condensing lens by way of the slit should be able to illuminate a certain angle a.

Figure 5B:
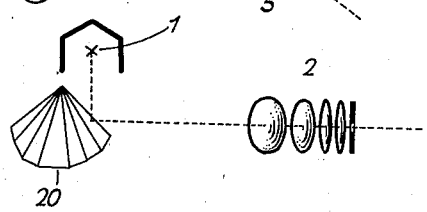

It will be understood that quite a number of other embodiments of this invention are conceivable. Under certain circumstances, it may be advantageous to make each optical system complete, and provide but one light-source 1, a separate condensing lens 2 and objective lens 5 being provided for each slit 7 and being mounted to come successively into alignment with the light source and scale 6 as the condenser shaft is adjusted. (Fig. 5a). As shown in Fig. 5b, the light issuing from lamp 1 may be conducted to condensing lenses 2 only by way of a pyramid consisting of reflecting surfaces 20.

The arrangement shown in Fig. 6 is distinguished by ease of adjustment and simplicity. In this case spindle 11 rotates when the rotary condenser is being adjusted. Carried by the said spindle is a hollow body 12 which partakes of the rotation, said hollow body 12, in turn, supporting spherical portions 13 suitably spaced apart and in which hemispheres 15 are fitted which may be turned by handles 14 and which are held by clamps (not shown). The spherical bodies 15 each carry a mirror 20 on the side turned towards the spindle, the mirror 20 being readily adjustable by the handle 14. The said mirrors 20 are illuminated by way of adjustable and lockable systems comprising condensing lens 2 and slit 7 from a lamp 1 located upon the axis of spindle 11. The reflected light is thrown upon the scale by way of the objective 5 supported between lamp 1 and spindle 11. Upon the latter being turned, then together with the light-ray pencil coming from the mirror 20 also the image of the slit 7 will move over the scale 6. After one dial section has been covered, another mirror starts to become operative and throws the light upon the adjacent scale section.

Another scheme falling within the scope of this invention is to so dispose the objective that the object face thereof is turned towards the image, i. e., the scale. In this arrangement, the lens is no longer corrected to the curvature of the picture field, and this offers a great advantage. For it will be noted that about the spindle 11 only one rotation and no further movement should take place, and the consequence is that the distance between diaphragm 7 and objective 5 measured by way of the mirror 20 remains constant during the rotation. Or, putting it in different words: The virtual image of the slit 7 which is in the rear of the mirror, travels over a spherical surface about the objective lens.

The object which is to be imaged is as will be seen not planar so that, with the lens corrected for curvature of image field, could not be sharply outlined upon the flat scale 6 in all positions of the condenser as shown in Fig. 8a. In this figure the object is denoted by 28 and its image by 29, it being noted that the latter is of curved form similar to 28. But if a lens 5 is used which has not been corrected in this respect—and this will be true of any corrected lens if object and image sides are transposed—it is possible to insure a sharp image and outline of the slit, if suitable dismensions have been chosen, regardless of the condenser position, if the curvature of the image field is just such that a spherical surface 28 is imaged upon a planar surface 30 as shown in Fig. 8b.

Of particular importance is the proper choice of the form of the spot, or, what amounts to the same thing, the diaphragm or slit 7. Fig. 9 shows a suitable shape of the same. Over an opening 22 is stretched a slender wire, a hair, or the like 23. This wire, in optical image, represents a dark line upon a light background formed by the light through 22. The position of the line in reference to the scale can then be readily read or distinguished.

Having described my invention, what I claim and desire to secure by Letters Patent is:

1. A device for indicating the rotative position of radio tuning mechanism, comprising a scale having a plurality of parallel screen sections, a source of light and condensing lens means, a curved rotatable member operatively connected to the radio tuning mechanism and provided with a plurality of light apertures therethrough positioned at spaced intervals on a helical line of the curved surface of said member, and a projection objective positioned between said curved member and said screen in optical alignment with said light source and said apertures whereby images of the apertures are successively projected upon said screen scales to indicate the rotative position of the tuning mechanism.

2. Means for indicating the position of a tuning device comprising the combination of a scale having a plurality of vertically arranged parallel sections, a stationary light source, a curved drum connected to said tuning device, an objective lens located between said light source and drum, an aperture in said drum positioned so as to cause light from said source to pass from the lower to the upper end of one of said scale sections in response to adjustment of said tuning means through a predetermined angle in one direction, and a second aperture in said drum laterally spaced from said first aperture and positioned to cause light from said source to pass from the lower to the upper end of a second of said scale sections in response to a further adjustment of said tuning means in the same direction.

3. The arrangement of claim 2 in which each of the apertures in said drum has a narrow opaque member extending across its central portion.

KARL SCHWARZ.